March 22, 1932.    J. O. McMILLAN    1,850,117
COMBINED CHECK VALVE AND UNLOADER
Filed Sept. 29, 1927    2 Sheets-Sheet 2

Inventor
J. O. McMillan,
By R. H. Stockman
Attorney

Patented Mar. 22, 1932

1,850,117

UNITED STATES PATENT OFFICE

JAMES O. McMILLAN, OF ELDORADO, KANSAS, ASSIGNOR TO STANDARD PUMP & SUPPLY COMPANY, OF WICHITA, KANSAS, A CORPORATION OF TEXAS

COMBINED CHECK VALVE AND UNLOADER

Application filed September 29, 1927. Serial No. 222,801.

This invention relates to an improved check valve or automatic unloader to be used with air or other gas compressors, and particularly to a combined check valve and bleed valve designed to be arranged in a pipe line between an air compressor and receiver for unloading the compressor when the latter stops running, or operates below a predetermined minimum speed.

The device forming the subject matter of the invention includes a non-pulsating leak-proof check valve, operating in the discharge pipe of a compressor, and designed to cooperate with the bleed valve for automatically unloading a portion of the discharge pipe adjacent to the compressor, whenever the compressor ceases its compressive action or reduces the same to a predetermined minimum, thereby facilitating the starting of the compressor against pressure in the mains or tanks which the compressor is supplying, and which are loaded beyond my improved loading device.

The invention is especially applicable to a compressor in which the starting and stopping of the motor or engine driving the compressor, is controlled by electrical or other suitable and usual means. The function of the unloader is primarily to provide for unloading during the starting period, and the check valve prevents leakage from the receiver after the compressor has ceased its compressive action or is operating below a certain minimum speed.

One of the objects of the invention is to provide an unloader for this purpose, including an oil dash pot of a non-leaking character, and adapted to cause the check valve to operate without pulsating, so that the device will be silent in operation and capable of long wear.

A further object of the invention is to provide the unloader with a relatively shallow sediment chamber, which will be automatically evacuated when the check valve operates to open the bleed valve.

A still further object is to furnish a device of this character, formed of a number of parts detachably connected together, so that a part may be replaced whenever necessary, without discarding the entire device.

A still further object is to provide an unloader having a novel bleed valve structure which may be readily adjusted from the exterior of the unloader casing to adjust the period at which the bleed valve commences to open.

With the foregoing objects outlined and with other objects in view which will appear as the description proceeds, my invention consists in the novel features hereinafter described in detail, illustrated in the accompanying drawings, and more particularly pointed out in the appended claims.

Referring to the drawings.

Figure 1:
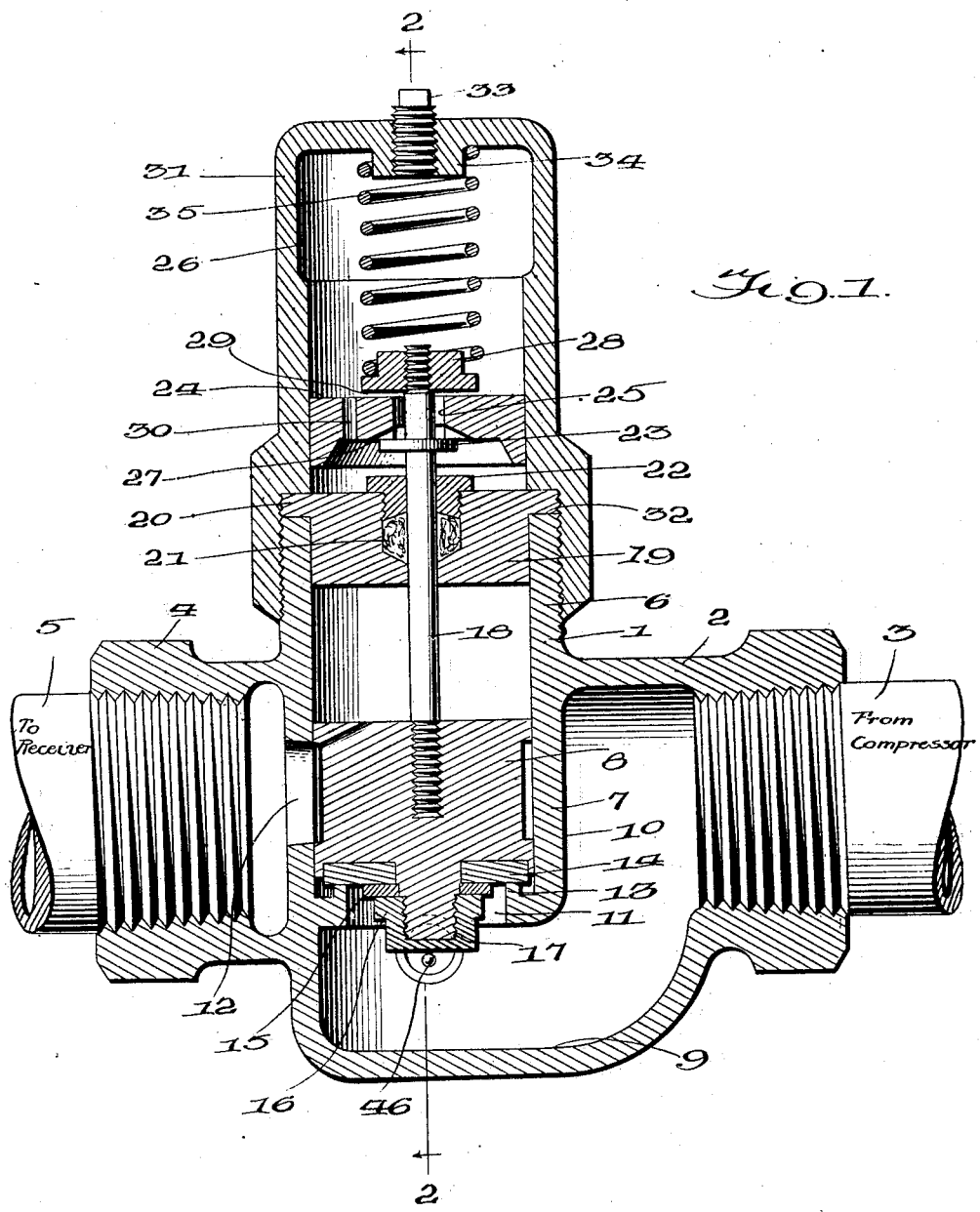
Fig. 1 is a vertical longitudinal sectional view of my improved device.
Figures 2, 3:
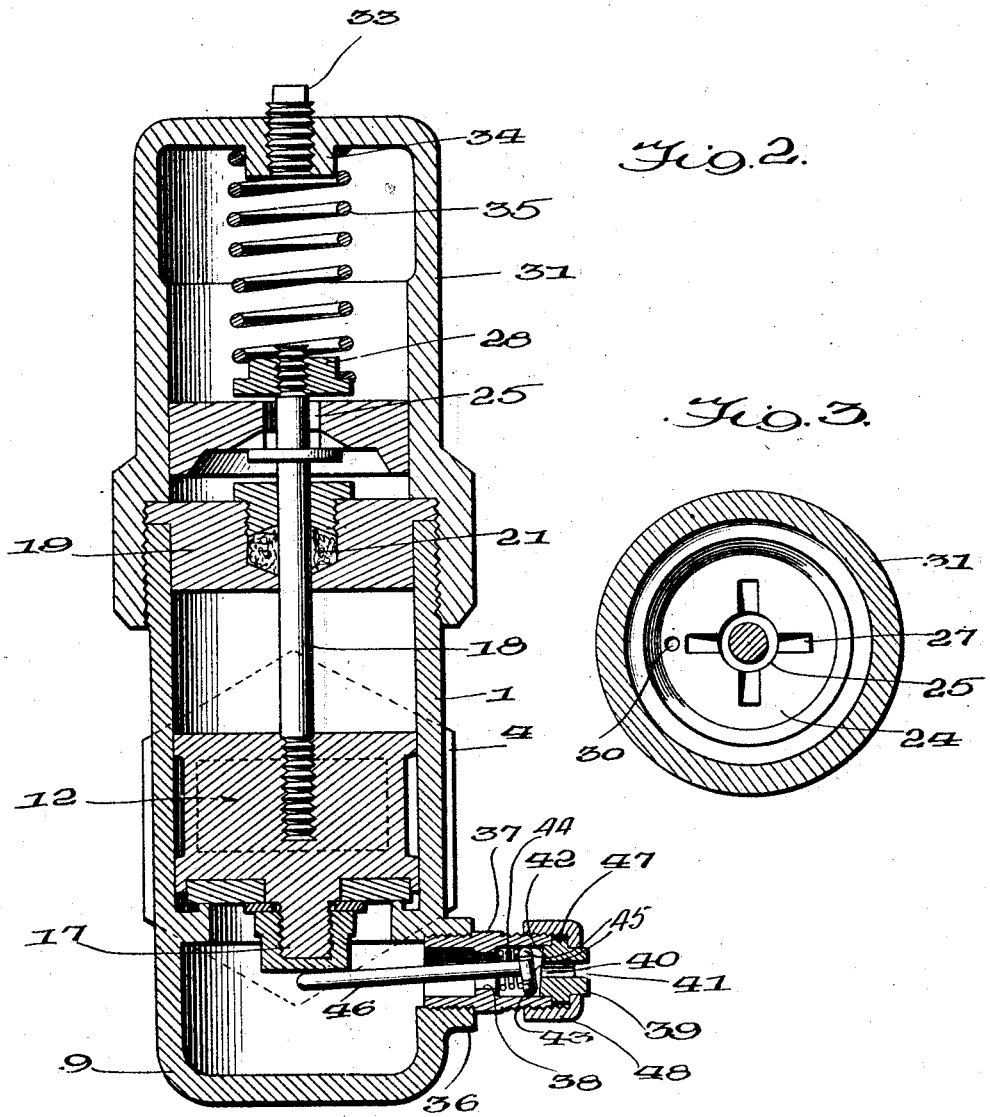
Fig. 2 is a transverse vertical sectional view, taken on line 2—2 of Fig. 1.
Fig. 3 is a bottom plan view of the dash pot piston.

In the drawings, 1 designates the body or main casing which is provided at one side with a threaded connection 2 to be attached to a pipe 3 leading from a compressor (not shown). The opposite side of the casing has a similar threaded connection 4 to be attached to a pipe 5 leading to a compressed air receiver (not shown).

A tubular extension 6, having external threads projects upwardly from the casing and is aligned with a cylindrical partition 7, located within the casing, which forms a chamber for the check valve 8.

The bottom of the casing provides a shallow basin 9 into which any sediment coming from the compressor will be precipitated by the surface 10 of the partition 7, and this sediment will be blown out of the casing through the bleed valve opening hereinafter described.

The check valve 8 controls an air inlet port 11 and an outlet port 12, one arranged in the bottom and the other in the side of the chamber 7, and the inlet port being surrounded by a valve seat 13, forming an abutment for a yielding packing washer 14, arranged on the lower surface of the check valve 8. This packing is secured in position by means of a washer 15 and a nut 16, both mounted on a threaded extension 17 at the lower end of the valve.

The check valve has a threaded connection with the lower end of a valve stem 18 which slides through a cover or partition 19 that fits in the tubular extension 6 of the valve casing, and has a circular flange 20 resting on the upper edge of said tubular extension. The rod slides through a packing 21 in the partition which cooperates with an adjustable gland 22.

The upper portion of the valve stem has a fixed abutment 23, engageable with the under side of a dash pot piston 24. This piston has a port 25 at its center, through which the valve stem passes, and this port is of larger diameter than the valve stem to allow oil or the like in a dash pot chamber 26 to flow through the piston 24 when the latter moves downwardly.

It will be noted that the abutment 23 is of larger diameter than the port 25, so in order to allow the fluid to flow past the abutment and through the port, radial notches 27 are provided in the lower face of the dash pot piston.

To loosely hold the piston on the valve stem, the latter is provided at its upper end with an adjustable nut 28 which can only be screwed down to a point where it will allow a clearance 29 between the nut and piston as the piston moves upwardly. A relatively small hole 30 extends through the piston to permit the liquid in the dash pot to slowly feed through the piston, as the piston moves downwardly, for at this time, the nut 28 will have closed the port 25.

The dash pot chamber 26 is formed within a cap or auxiliary casing 31, which has its lower end threaded to the tubular extension 6, and is provided with an annular shoulder 32 abutting against the flange 20 for sealing purposes.

The cap 31 has a threaded aperture at its upper end, closed by a threaded plug 33, and an annular flange 34 extends into the cap from its upper end and surrounds said aperture. The damping liquid is fed into the cap through the aperture at its upper end, and the flange 34 forms an indicator which the operator may use in filling the cap up to the lower end of the flange, but not above this point. When the cap has been filled to this extent, a small cushion of air is provided to take care of the oil displaced when the piston 24 is first moved upwardly under the force of air from the compressor.

The flange 34 also forms a projection, functioning as an anchoring means for one end of the coil spring 35; the other end of the spring engaging the nut 28 and tending to always force the piston and check valve downwardly.

It will thus be seen that the boss 34 has a dual function, the most important one of which is that of an indicator to permit the operator to observe when the oil has reached a certain point, so that he will not fill the device beyond this point.

As before stated, the unloader also includes a bleed valve structure. This is attached by providing the shallow basin 9 with an internally threaded boss 36 which receives a tubular bleed valve casing 37, having its end portions provided with external screw threads, and having its central portion provided with an internal annular flange 38. The bleed valve casing is provided at one end with an adjustable or rotatable valve seat 39, having a bleed port 40 extending therethrough, and provided at its outer end with a cross notch 41 to receive a screwdriver, which may be used to rotate this seat. The opposite end surface of the valve seat is arranged at a slight angle to the vertical, as shown at 42, and this surface engages the head 43 of the bleed valve; the latter being forced against the inclined face by a coiled spring 44 which abuts at one end against the flange 38, and at its other end against the head of the valve. The periphery of the valve head is notched as shown at 35, to permit air and sediment to pass by the bleed valve head, and to discharge through the port 40.

The bleed valve has a stem 46 which extends through the coil spring 44 and the tubular casing 47, and projects beneath the end 17 of the check valve, whereby, as the latter approaches its seat, the valve stem 46 will be rocked and the bleed valve will be opened. It is obvious that by turning the bleed valve seat 39, the annular face 42 will be adjusted, and in this way, the time of opening the bleed valve may also be hurried.

The bleed valve seat has an annular flange 47 which slides on the outer end of the tubular member 47, and is rotatably held in place by a screw cap 48.

In operation, air from the compressor will enter the end 2 of the unloader casing, and when a sufficient pressure has been built up in the casing, the check valve 8 will be lifted off its seat. As it rises, its movement will be cushioned by the dash pot, for at this time, the quick upward movement of the piston 24 will force the oil above the piston upwardly, and this will be compensated for by the air cushion at the upper end of the cap 31. At the same time, and continuing thereafter, oil will flow through the port 25 and notches 27, and through the hole 30, into the lower portion of the dash pot chamber 26. This will continue until the port 12 is opened, and then some of the air from the compressor will flow through the pipe 5 to the receiver. It will be observed that the upper portion of the chamber 26 is of larger diameter than the lower portion of the same, and consequently, provides a larger space for oil and eliminates a certain amount of machine work.

As the check valve rises, the spring 44 of the bleed valve will seat the latter, and close the bleed port 40, so that air will only leak through the latter for a relatively short time during the raising of the check valve 8.

As long as the compressor is operating above a predetermined minimum speed, the check valve 8 will be held in its upper position by the compressed air travelling through the unloader, but immediately upon the speed falling below said predetermined minimum, or upon the stopping of the compressor, the spring 35 will begin to seat the check valve 8. This operation will be slower, however, than the opening of the check valve, for as the piston moves downwardly, the nut 28 will close the port 25, and then the only passage for the oil is by way of the small hole 30. As the check valve moves downwardly, its lower end 17 will rock the bleed valve stem 46, and thus open the port 40, so that any air in the pipe 3, connection 2 or basin 9, may readily escape through said port. At the same time, the force of the air will blow any sediment past the bleed valve, and out through the port.

It will be obvious to those skilled in the art, without further description, that the present device is of simple and inexpensive construction, and may be easily repaired when the same is necessary. Furthermore, it is apparent that the oil in the dash pot will be retained in place indefinitely, and need only be renewed or added to, after long periods of operation; and that the device will operate noiselessly and with a minimum of wear.

I am aware that changes may be made in the details disclosed, without departing from the spirit of the invention as expressed in the claims.

What I claim and desire to secure by Letters Patent is:

1. In a device of the character described, a valve casing having an inlet and an outlet, a partition in the casing dividing the interior of the same into an intake chamber and an outlet chamber, a port in the partition for placing the chambers in communication, a check valve in the casing adapted to control the port, and opening under fluid pressure admitted through said inlet, means for closing said valve, a bleed valve for the intake chamber controlled by the check valve, and an oil dash pot structure for cushioning the movement of the check valve in either direction, said oil dash pot structure including a stem having spaced abutments thereon, a piston movable axially on the stem between said abutments and having a port through which the stem passes, one of said abutments functioning to close the port when the stem is moved in one direction, said piston having a relatively small hole spaced from the axis of the stem a greater distance than the periphery of either of said abutments to permit the oil to flow through the piston when the latter is moved in the last mentioned direction.

2. In a device of the character described, a valve casing having an inlet and an outlet, a partition in the casing dividing the interior of the same into two chambers, a port in the partition for placing the chambers in communication, a check valve in the casing adapted to control the port, a second removable partition at the top of the casing, a valve stem slidable through the second partition and detachably connected to said check valve, a cap detachably connected to the valve casing, holding the second partition in position and with the latter, forming a dash pot chamber, abutments on the stem and arranged within the dash pot chamber, a piston axially movable on the stem and engageable with the abutments, ports in the piston through which oil may pass, one of said ports being controlled by one of said abutments, a spring exerting its force against the stem for closing the check valve, and a bleed valve controlled by the check valve and functioning to evacuate one of the chambers of the valve casing.

3. A combined check valve and unloader for use with air compressors, including a valve casing having an inlet and an outlet, a partition in the casing dividing the interior of the same into an intake chamber and an outlet chamber, a port in the partition for placing the chambers in communication, a check valve in the casing adapted to control the port and opening under fluid pressure admitted through said inlet, a cap on the casing, a second partition separating the interior of the cap from the outlet chamber, a stem secured to said valve and sliding through the second partition, spaced abutments arranged on the stem within the cap, a piston loosely mounted on the stem between said abutments and having centrally disposed openings to permit oil to flow along the stem through the piston when the latter is moving upwardly, notches in the piston extending from the openings to the lower surface of the piston to permit oil to flow through the openings even though the lower one of said abutments is pressing against the under surface of the piston, a small port extending through the piston at a distance from the stem greater than the periphery of either of said abutments, a spring in the cap bearing on one of said abutments, for closing the check valve, and a bleed valve for the intake chamber controlled by the check valve.

JAS. O. McMILLAN.

CERTIFICATE OF CORRECTION.

Patent No. 1,850,117. Granted March 22, 1932, to

JAMES O. McMILLAN.

It is hereby certified that the name of the assignee in the above numbered patent was erroneously described and specified as "Standard Pump & Supply Company", whereas said name should have been described and specified as Air-O-Matic Manufacturing Company, as shown by the records of assignments in this office; and that the said Letters Patent should be read with this correction therein that the same may conform to the record of the case in the Patent Office.

Signed and sealed this 7th day of June, A. D. 1932.

(Seal)

M. J. Moore,
Acting Commissioner of Patents.